(12) United States Patent
Ohrstrom Sandgren et al.

(10) Patent No.: US 7,496,056 B2
(45) Date of Patent: Feb. 24, 2009

(54) CONFERENCE CONNECTIONS USING DYNAMIC TOPOLOGY SWITCHING FOR IP AND CIRCUIT-SWITCHED FABRICS

(75) Inventors: Thorsten F. Ohrstrom Sandgren, Thornton, CO (US); Albert D. Pessot, Boulder, CO (US); Rongrui Xiao, Superior, CO (US)

(73) Assignee: Avaya Inc., Basking Ridge, NJ (US)

( * ) Notice: Subject to any disclaimer, the term of this patent is extended or adjusted under 35 U.S.C. 154(b) by 601 days.

(21) Appl. No.: 11/105,604

(22) Filed: Apr. 13, 2005

(65) Prior Publication Data
US 2006/0146737 A1    Jul. 6, 2006

Related U.S. Application Data

(60) Provisional application No. 60/641,550, filed on Jan. 4, 2005.

(51) Int. Cl.
*H04L 12/16* (2006.01)
(52) U.S. Cl. .................. 370/260; 370/254; 370/401; 379/202.01; 455/414.1; 348/14.081
(58) Field of Classification Search ............ 379/202.01; 455/414.1; 348/14.08
See application file for complete search history.

(56) References Cited

U.S. PATENT DOCUMENTS

| | | | |
|---|---|---|---|
| 5,206,903 | A | 4/1993 | Kohler et al. |
| 5,280,561 | A | 1/1994 | Satoh et al. |
| 5,828,747 | A | 10/1998 | Fisher et al. |
| 5,905,793 | A | 5/1999 | Flockhart et al. |
| 5,974,114 | A | 10/1999 | Blum et al. |
| 5,982,873 | A | 11/1999 | Flockhart et al. |
| 6,163,607 | A | 12/2000 | Bogart et al. |
| 6,173,053 | B1 | 1/2001 | Bogart et al. |
| 6,192,122 | B1 | 2/2001 | Flockhart et al. |
| 6,282,192 | B1 | 8/2001 | Murphy et al. |

(Continued)

FOREIGN PATENT DOCUMENTS

EP        0805576 A2     11/1997

(Continued)

OTHER PUBLICATIONS

Cisco Systems Overview—Cisco IOS Telephony Services: Survival Remote Site Telephony, "Now Cost-Effectively Extend Cisco CallManager IP Telephony and High Productivity Applications to Small Branch Office Sites" Copyright 2001, Cisco Systems, Inc., pp. 1-4.

(Continued)

*Primary Examiner*—Duc C Ho
(74) *Attorney, Agent, or Firm*—Sheridan Ross P.C.

(57) ABSTRACT

A system for call conferencing a plurality of participants is provided that includes (a) an input operable to receive, from a conference call participant A-E, at least one of (i) a selective listening request and (ii) a request to remove selective listening, wherein the communication devices 416a-e of the conference call participants A-E are connected to a plurality of gateways 408, 424; and (b) a conference configuration agent 346 operable, in response thereto and during the conference call, to change from a first conference topology to a second conference topology, wherein the first and second conference topologies have a different number of inter-gateway connections.

29 Claims, 6 Drawing Sheets

U.S. PATENT DOCUMENTS

| | | | |
|---|---|---|---|
| 6,292,463 | B1 | 9/2001 | Burns et al. |
| 6,314,114 | B1 | 11/2001 | Coyle et al. |
| 6,411,705 | B2 | 6/2002 | Oran et al. |
| 6,434,226 | B1 | 8/2002 | Takahashi |
| 6,504,922 | B1 | 1/2003 | Erb |
| 6,574,469 | B1 | 6/2003 | Xiang et al. |
| 6,665,375 | B1 | 12/2003 | Forlenza et al. |
| 6,671,262 | B1 | 12/2003 | Kung et al. |
| 6,721,712 | B1 | 4/2004 | Benyassine et al. |
| 6,731,734 | B1 | 5/2004 | Shaffer et al. |
| 6,738,343 | B1 | 5/2004 | Shaffer et al. |
| 6,801,612 | B2 | 10/2004 | Malcolm et al. |
| 6,925,076 | B1 | 8/2005 | Dalgic et al. |
| 6,937,873 | B2 | 8/2005 | Levy et al. |
| 6,950,874 | B2 * | 9/2005 | Chang et al. ............ 709/229 |
| 6,968,382 | B2 | 11/2005 | McBrearty et al. |
| 6,973,506 | B2 | 12/2005 | Ishiyama et al. |
| 7,042,871 | B2 | 5/2006 | Gallant et al. |
| 7,145,900 | B2 | 12/2006 | Nix et al. |
| 7,161,897 | B1 | 1/2007 | Davies et al. |
| 7,215,643 | B2 | 5/2007 | Mussman et al. |
| 7,227,927 | B1 | 6/2007 | Benedyk et al. |
| 7,243,142 | B2 | 7/2007 | Poirot et al. |
| 2003/0031137 | A1* | 2/2003 | Mecklin Tomas ........ 370/252 |
| 2003/0091024 | A1 | 5/2003 | Stumer |
| 2003/0140084 | A1* | 7/2003 | D'Angelo ............... 709/106 |
| 2004/0028199 | A1 | 2/2004 | Carlson |
| 2004/0101119 | A1 | 5/2004 | Malcolm et al. |
| 2004/0143665 | A1 | 7/2004 | Mace et al. |
| 2004/0252676 | A1 | 12/2004 | Bye |
| 2005/0068889 | A1 | 3/2005 | Chavez et al. |
| 2005/0281216 | A1 | 12/2005 | Varonen et al. |
| 2006/0034297 | A1 | 2/2006 | O'Neill |
| 2006/0067274 | A1 | 3/2006 | Gillespie et al. |
| 2006/0092919 | A1 | 5/2006 | Hallmark et al. |
| 2006/0146799 | A1 | 7/2006 | Baldwin et al. |
| 2006/0146802 | A1 | 7/2006 | Baldwin |
| 2006/0146859 | A1 | 7/2006 | Baldwin et al. |
| 2006/0168326 | A1 | 7/2006 | Baldwin et al. |

FOREIGN PATENT DOCUMENTS

| | | |
|---|---|---|
| EP | 0 910 176 A2 | 6/1999 |
| EP | 0964563 | 12/1999 |
| EP | 1091550 | 4/2001 |
| EP | 1250023 A1 | 10/2002 |
| EP | 1677569 A1 | 7/2006 |
| EP | 1677570 A1 | 7/2006 |
| JP | 08-065340 | 3/1996 |
| JP | H8-320800 | 12/1996 |
| JP | H10-164240 | 6/1998 |
| JP | H10-214240 | 8/1998 |
| JP | 2000-174824 | 6/2000 |
| JP | 2001-156786 | 6/2001 |
| JP | 2001-196165 | 7/2001 |
| JP | 2002-522962 | 7/2002 |
| JP | 2002-237896 | 8/2002 |
| JP | 2002-305588 | 10/2002 |
| JP | 2003-514439 | 4/2003 |
| JP | 2003-244204 | 8/2003 |
| WO | 00/72560 A1 | 11/2000 |
| WO | WO 01/65808 | 9/2001 |
| WO | WO 00/72536 | 11/2001 |

OTHER PUBLICATIONS

Cisco Systems Solutions Guide—"Survivable Remote Site Telephony Cisco 2600/3600 Voice Technical Marketing" Copyright 1992-2001, Cisco Systems, Inc., pp. 1-19.

Cisco Systems IOS Release 12.2(8)T—Survivable Remote Site Telephony, pp. 1-74, undated.

Cisco Solutions Guide—"Survivable Remote Site Telephony Cisco 2600/3600 Voice Technical Marketing" Copyright 1992-2001, Cisco Systems, Inc., http://www.cicso.com/warp/public/cc/pd/unco/srstl/tech/demha_sg.htm (21 pages).

Cisco Systems—Survivable Remote Site IP Telephony, Copyright 1992-2003, Cisco Systems, Inc., http://www.cisco.com/warp/public/cc/pd/unco/srstl, 1 page.

Cisco Systems White Paper—"Ensuring IP Telephony High Availability in the Branch Office, Now Cost-effectively Extend Cisco CallManager IP Telephony to Small Branch Office Sites Using Cisco Survivable Remote Site Telephony" Copyright 1992-2005, Cisco Systems, Inc., http://www.cisco.comlen/us/products/sw/voicesw/ps2169/products_white_paper09186a008 . . . (5 pages).

Cisco IP Telephony Solution Reference Network Design, Dial Plan, #9562230403, Chapter 8, pp. 1-70, undated.

Lucent Technologies Merlin Legend Communications System, Release 6.1, Network Reference, 555-661-150 Comcode 108289703; Issue 1, Aug. 1998; 369 pages.

European Examination Report for counterpart application, EP 05 25 8065, Nov. 15, 2006, 3 pages.

U.S. Appl. No. 11/231,203, filed Sep. 19, 2005, Baldwin.

European Search Report for counterpart application, EP 05 25 8065; Mar. 30, 2006.

Clark, William J.; "Multipoint Multimedia Conferencing"; IEEE Communications Magazine; May 1992; pp. 44-50.

U.S. Appl. No. 11/080,763, filed Mar. 14, 2005, Coughlan et al.

M. Bozinovski et al., "Fault-tolerant SIP-based call control system," Electronics Letters, vol. 39, No. 2 (Jan. 23, 2003), pp. 254-256, XP006019695 ISSN: 0013-5194.

ITU-T Recommendation H.248, "Series H: Audiovisual and Multimedia Systems," International Telecommunication Union (Jun. 2000), pp. 1-121.

Kristol and Montulli, "HTTP State Management Mechanism," Oct. 2000, pp. 1-22, available at http://www.cse.ohio-state.edu/cgi-bin/rfc/rfc2965.html, printed Feb. 3, 2005.

"Separation of Bearer and Signaling for Avaya™ Communication Manager," Avaya, Issue 1 (May 2003) pp. 1-42.

Extended European Search Report for EP Application No. 05258065.1 (Mar. 30, 2006).

Carroll Communications, Inc. Automatic Route Selection (ARS) Feature, at http://www.carrollcommunications.com/merlinmagix/AutomaticRouteSelection.html, 2 pages, Jul. 13, 2005.

KXTD System—ISDN—Basic and Primary Rate Interfaces, at http://www.thetelephoneexchange.co.uk/Teleweb_files/kxtd.html, 5 pages, Jul. 13, 2005.

Definition—automatic route selection (ARS) at http://www.atisorg/tg2k/automatic_selection_route.html, 1 page, Jul. 13, 2005.

Acronym Finder—ARS at http://www.auditmypc.com/acronym/ARS.asp, 2 pages, Jul. 13, 2005.

WestNet Learning—glossary for UDP, at http://glossary.westnet.com/term.php? termId=2213, 1 page, Jul. 12 2005.

Declaration of Michael Gruen Under 37 CFR Section 1.98; 3 pages, Jul. 13, 2005.

Examiner's Office Letter (including translation) for Japanese Patent Application No. 2005-377556, mailed Jul. 22, 2008.

Examination Report for European Patent Application No. 05258065.1, mailed Sep. 24, 2008.

* cited by examiner

Fig. 8C

## CONFERENCE CONNECTIONS USING DYNAMIC TOPOLOGY SWITCHING FOR IP AND CIRCUIT-SWITCHED FABRICS

CROSS REFERENCE TO RELATED APPLICATION

This application claims the benefits under 35 U.S.C. § 119 of U.S. Provisional Patent Application Ser. No. 60/641,550, filed Jan. 4, 2005, of the same title and to the same inventors, which is incorporated herein by this reference.

FIELD

The invention relates generally to telecommunications infrastructures and particularly to multi-party conference connections

BACKGROUND

Primarily in business applications, multi-party communications or conference calls among spatially dislocated parties are widely and frequently used to communicate effectively. For conferencing within a single communication system, a single connection topology, typically, the fully inter-connected mesh or star, is generally selected. This single connection topology assumes that all bandwidth is created equal, whether the bandwidth crosses a Local Area Network or Wide Area Network. For conferencing between/among peer-to-peer systems, where each system produces its own local conference, dumbbell topologies are typically selected.

Figure 1:
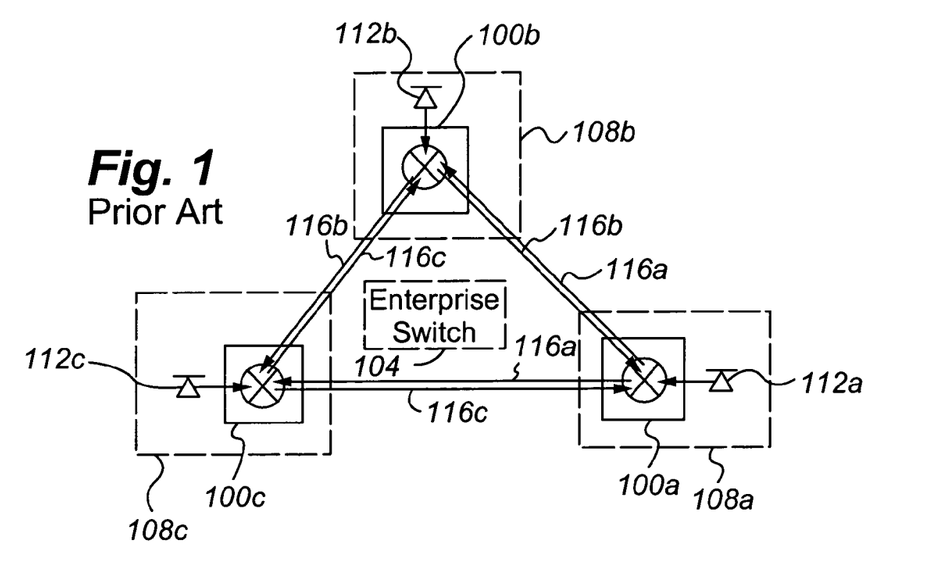
FIG. 1 is a block diagram depicting a prior art multi-party conferencing arrangement.

The fully inter-connected mesh, an example of which is shown in FIG. 1, requires significant bandwidth and conferencing resources since each conference participant needs to construct their own composite sum of the other parties, and each conference participant needs to transmit their signal to all other participants. Referring to FIG. 1, first, second, and third port networks 100a-c are controlled by a common enterprise switch 104. The port networks 100a-c are located at different geographic locations 108a-c. At each location, a party (not shown) uses a corresponding communication device 112a-c to conduct a conference call with the other parties. The communication device of each party transmits a unidirectional audio stream 116a (for device 112a), 116b (for device 112b), and 116c (for device 112c) to the other communication devices. This configuration is acceptable when the connection network is proprietary. In a full mesh N party conference, the required numbers of transmitted streams is (N(N−1)) and of conference points is N. A 3-party conference call, such as shown in FIG. 1, would produce six unidirectional audio streams to cross the intervening Wide Area Network or WAN and require three conferencing points. As will be appreciated, full mesh is commonly used for a center-stage switch or asynchronous transfer mode connected port networks and not for IP WAN networks.

Figure 2:
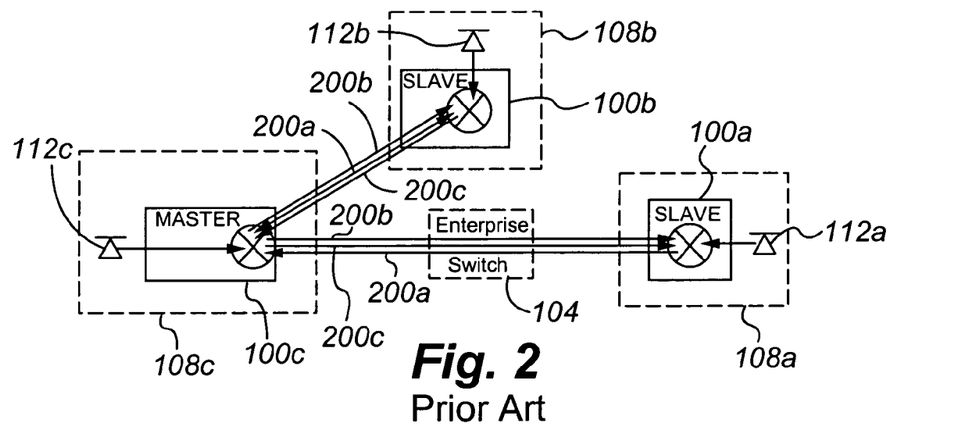
FIG. 2 is a block diagram depicting a prior art multi-party conferencing arrangement.

To reduce the required bandwidth resources, a star topology has been used, where each party sends its signal to a central conferencing or master circuit (where conferencing occurs), which is typically in a gateway. Referring to FIG. 2, the hardware configuration of FIG. 1 is depicted. Unidirectional audio streams 200a-c (among the devices 112a-c) are transmitted between the parties. The third port network 100c is the master and provides the conferencing circuit, while the first and third port networks 100a,b are the slaves and receive the audio streams provided by the master. The first port network 100a transmits audio stream 200a (which is the audio stream received from the first communication device 112a) to the third port network 100c and receives, from the third port network 100c, audio streams 200b,c (which, respectively are the audio streams received by the second port network 100b from the communication device 112b and by the third port network 100c from the communications device 112c). The second port network 100b transmits audio stream 200b to the third port network 100c and receives, from the third port network 100c, audio streams 200a,c. In a star topology N party conference, the required numbers of transmitted streams is 2N, and of conference circuits is one. For example, in FIG. 2 the three-party conference call produces six unidirectional audio streams to be transmitted over the intervening WAN and require one conferencing point.

Figure 3:
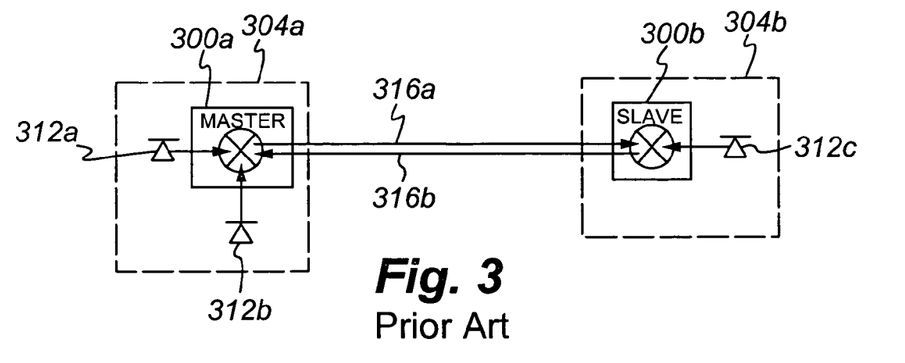
FIG. 3 is a block diagram depicting a prior art multi-party conferencing arrangement.

A compromise between the fully inter-connected mesh and the star is a dumbbell topology, where each participant sends its signal to a local conferencing point, the signals are partially summed or combined, and the partial conference sum is then sent to other local conferencing points. An example of a dumbbell is shown in FIG. 3. A first gateway 300a controlled by a first server (not shown) in a first enterprise 304a is in communication via a WAN (not shown) with a second gateway 300b controlled by a second server (not shown) in a second enterprise 304b. First and second parties using first and second communication devices 312a and b are in a conference call with a third party using a third communication device 312c. The audio streams of the first and second parties are combined or summed to form a combined audio stream 316a and transmitted to the second gateway 300b. The second gateway meanwhile transmits to the first gateway the audio stream 316b of the third party. In a dumbbell topology N party conference call with M locations, the required numbers of transmitted streams is 2N+2(M−1) and of conference circuits is M. For example, in FIG. 3, the three-party conference call produces two unidirectional audio streams to be transmitted over the intervening WAN.

Apart from bandwidth requirements, the star and fully inter-connected mesh generally allow each party full flexibility in determining the set of other parties that they may be connected to. For example, in the examples of FIGS. 1 and 2 the second party can choose to speak and/or listen only to the first party. This selective listening is known as a sidebar. The dumbbell topology commonly does not allow a receiver to connect to a subset of parties from a remote location since they only receive a combined conferenced sum of the entire remote location.

There is a need for a conferencing system that can balance bandwidth requirements against the need to provide the conference participants with various conferencing features, such as selective listening.

SUMMARY

These and other needs are addressed by the various embodiments and configurations of the present invention. The present invention is generally directed to a system and method for providing multi-party conference calls in which various conference call topologies may be implemented during the conference call to implement the desired listening topology of the participants.

In one embodiment, a method for call conferencing a number of participants is provided that includes the steps:

(a) receiving from a conference call participant at least one of (i) a selective listening request and (ii) a request to remove selective listening; and (b) in response thereto and during the conference call, changing from a first conference topology to a second conference topology. As used herein, "selective listening" refers to a multi-party conference call listening topology in which an audio stream of a first party in the conference call is not provided to a second party in the conference call and/or an audio stream of the second party is not provided to the first party.

The participants' communication devices are connected to a number of different gateways, and the first and second conference topologies have a different number of inter-gateway connections. The inter-gateway connection may be an inter- or intra-region or enterprise connection. As used herein, "gateway" includes not only computational components understood by those in the telecommunication art to be gateways but also computational components that perform all or some of the functionality of gateways, such as port networks.

The conference topologies can be any desired inter-gateway connection topology including the fully inter-connected mesh, star, dumbbell, and composite topologies thereof. The use of star or dumbbell topologies can be independent of the underlying connection network. They may be packet-switched connected, circuit-switched connected, or combinations thereof.

The ability of the system to switch dynamically between conference topologies not only in inter-enterprise but also in intra-enterprise conference calls can permit the same conference call to realize differing objectives at differing times to reflect the changing desires of the participants. The dumbbell topology can allow the parties to be conferenced using a minimal amount of bandwidth while the star and fully inter-connected mesh topologies can allow the most flexible set of talk/listen relationships, including sidebars. Compared to the fully intercornected mesh topology, the star topology further can use a lesser number of conference points to realize the desired set of talk/listen relationships.

The topology transition can occur dynamically when a selective conferencing feature is activated or deactivated during the specified conference call. The call can therefore use a dumbbell topology to minimize WAN connection costs while being able to transition dynamically to a star topology when unique conference connections need to be created. When the unique conference connections are no longer desired or needed, it may revert back to the more efficient dumbbell topology.

The present invention can further adjust the selection of the master gateway as conference topologies change. As will be appreciated, the placement of the master gateway can have a significant impact on the number of inter-gateway connections needed and therefore resource and bandwidth utilization.

The present invention can allow parties in the same gateway to share efficiently both intra-region and inter-region connections. By using inter-gateway connections to create partial conference sums, it can provide an efficient connection topology that minimizes substantially usage of Voice over IP resource usage and IP network bandwidth.

These and other advantages will be apparent from the disclosure of the invention(s) contained herein.

As used herein, "at least one . . . and", "at least one . . . or", "one or more of . . . and", "one or more of . . . or", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, and A, B and C together.

The above-described embodiments and configurations are neither complete nor exhaustive. As will be appreciated, other embodiments of the invention are possible utilizing, alone or in combination, one or more of the features set forth above or described in detail below.

BRIEF DESCRIPTION OF THE DRAWINGS

FIG. 8A is a block diagram of another multi-party conferencing arrangement according to the embodiment of the present invention;

FIGS. 8B and C, respectively, depict time slot configurations to accommodate the conferencing arrangement of FIG. 8A.

DETAILED DESCRIPTION

Figure 4:
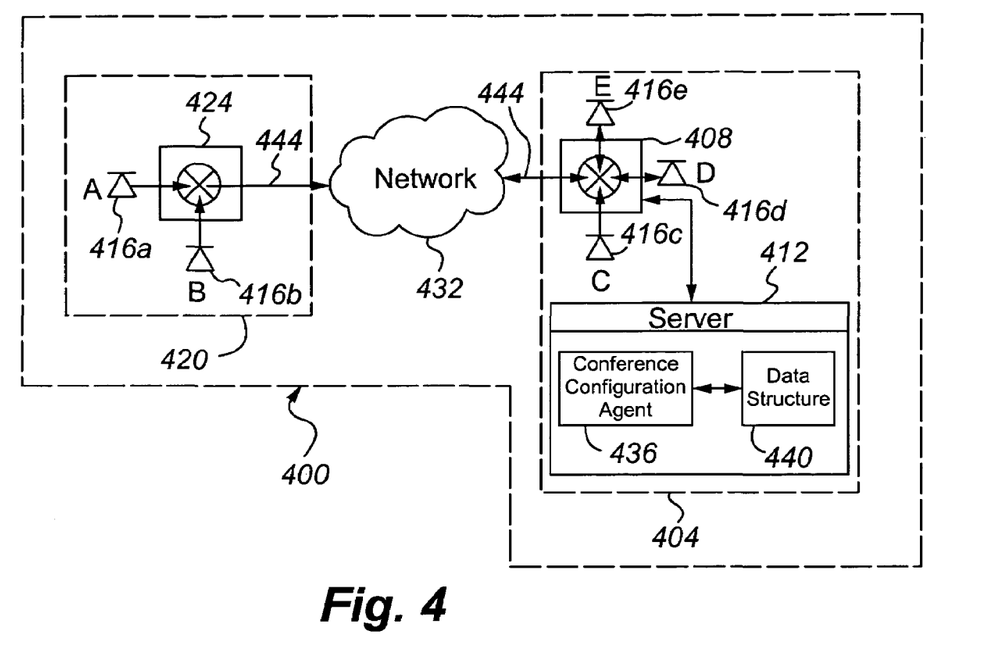
FIG. 4 is a block diagram of a multi-party conferencing arrangement according to an embodiment of the present invention.

Referring to FIG. 4, a first architecture embodiment of the present invention will be discussed. The architecture is an enterprise network 400 that includes, at a first geographical location 404, a first gateway 408 controlled by a media server 412 and enabling communications by subscriber communication devices 416c-e corresponding to conference call parties C-E and, at a second geographic location 420, a second gateway 424 also controlled by the server 412 and enabling communications by subscriber communication devices 416a-b corresponding to conference call parties A and B. The first and second gateways are in communication with one another via an intermediate network 432. The parties A-E are shown as being engaged in a multi-party conference call with one another using a dumbbell topology. The bidirectional audio (bearer) stream 444 represents the partial sums of the audio streams of the parties C-E and of parties A-B.

Each of the subscriber communication devices 416a-e can be one or more wireline or wireless packet-switched and/or circuit-switched communication devices. For example, the devices can be Avaya Inc.'s, 4600 Series IP Phones™, IP softphones such as Avaya Inc.'s, IP Softphone™, Personal Digital Assistants or PDAs, Personal Computers or PCs, laptops, H.320 video phones and conferencing units, voice messaging and response units, traditional computer telephony adjuncts, and wired and wireless circuit-switched telephones.

Each of the gateways 408 and 424 is an electronic signal repeater and protocol converter that commonly provides a telephone exchange service, supporting the connection of various types of telephones (such as Digital Control Processor or DCP phones, analog phones, and IP telephones) and outside packet-switched and/or circuit-switched telephone lines (such as analog trunks, ISDN lines, E1/T1 voice trunks, and WAN routing IP trunks). Telephone lines are typically connected to the gateway via ports and media modules on the chassis, with different media modules providing access ports for different types of telephones and lines. Voice and signaling data between packet-switched and circuit-switched protocols is normally effected by the media modules converting the voice path to a TDM bus inside the gateway. An engine, such as a Voice Over IP or VoIP engine, converts the voice path from the TDM bus to a compressed or uncompressed and packetized VoIP, typically on an Ethernet connection. Each gateway commonly includes a number of port and trunk circuit packs for performing selected telecommunications functions, such as (DTMF) tone detection, tone generation, playing audio (music and/or voice) announcements, traffic shaping, and call admission control, a media processor, and one or more IP server interfaces. The gateway may perform policy-based routing, which uses a policy list structure to implement a routing scheme based on traffic source, destination, type, and other characteristics. Common applications include separate routing for voice and data traffic, routing traffic originating from different sets of users through different Internet connections (or Internet Service Providers or ISP's), and defining backup routes for defined classes of traffic. The controller for each gateway may be located in the media server 412 or, stated differently, the gateway is commonly external and not internal to the media server 412. Examples of gateways include Avaya Inc.'s SCC1™, MCC1™, CMC™, G350™, G600™, G650™, and G700™.

The media server 412 controlling the gateway can be any converged architecture for directing circuit-switched and/or packet-switched customer contacts to one or more communication devices. Typically, the server is a stored-program-controlled system that conventionally includes interfaces to external communication links, a communications switching fabric, service circuits (e.g., tone detectors and generators, announcement circuits, etc.), memory for storing control programs and data, and a processor (i.e., a computer) for executing the stored control programs to control the interfaces and the fabric and to provide automatic contact-distribution functionality. Illustratively, the media server can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Avaya Inc.'s IP600™ LAN-based ACD system, or an S8100™, S8300™, S8500™, S8700™, or S8710™ media server running a modified version of Avaya Inc.'s Communication Manager™ voice-application software with call processing capabilities and contact center functions. Other types of known switches and servers are well known in the art and therefore not described in detail herein.

The wide area network 432 may be circuit-switched (e.g., the Public Switched Telephone Network or PSTN) or packet-switched (e.g., a Wide Area Network or WAN such as the Internet or a Local Area Network or LAN). Commonly, the network 432 is packet-switched and employs one or more of the TCP/IP suite of protocols, the Session Initiation Protocol or SIP, and/or the H.323 protocol.

Referring to FIG. 4, included among the data stored in the media server 412 is a conferencing configuration agent 436 and data structures 440 used for configuring the listening topology for a conference call. The agent 436 receives configuration requests, such as selective listening and sidebar requests (e.g., Avaya Inc.'s Whisper Page feature), and constructs the listening topologies to implement the requests. In one operational mode, the agent 436 can dynamically convert back-and-forth between conference call (or inter-gateway connection) topologies, such as from a star or fully interconnected mesh to a dumbbell. As will be appreciated, other conference call topologies may be employed depending on the enterprise policy objectives, such as bandwidth usage rates.

Figure 5:
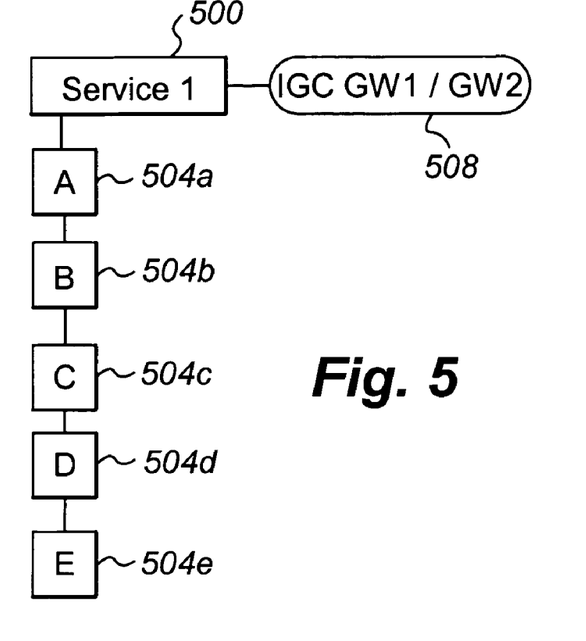
FIG. 5 depicts data structures for the arrangement of FIG. 4.

FIG. 5 depicts an example of the data structures used by the media server 412 in the dumbbell conference topology of FIG. 4. In the dumbbell conference topology each of the parties A-E listens to the audio stream transmitted by the communication device 416 of each of the other parties. As shown in FIG. 5, the service 1 500 associated with the conference call is linked to contexts 504a-e respectively corresponding to parties A-E. The contexts can be, for example, bearer path port identifiers associated with the communication device of each party A-E. The inter-gateway connection ("IGC") between the first and second gateways is described by a data structure 508 associated with the service 1 500.

In the data structure of FIG. 5, it is important to note that the IGC is not owned or assigned to a specific port. In existing prior art configurations, the IGC is an extension of the physical port into the master group, and the service port record points to one and only one IGC. In contrast in the data structure of FIG. 5, the IGC's do not belong to a specific port but are a non-ordered linked list that belongs to the service.

Figure 6:
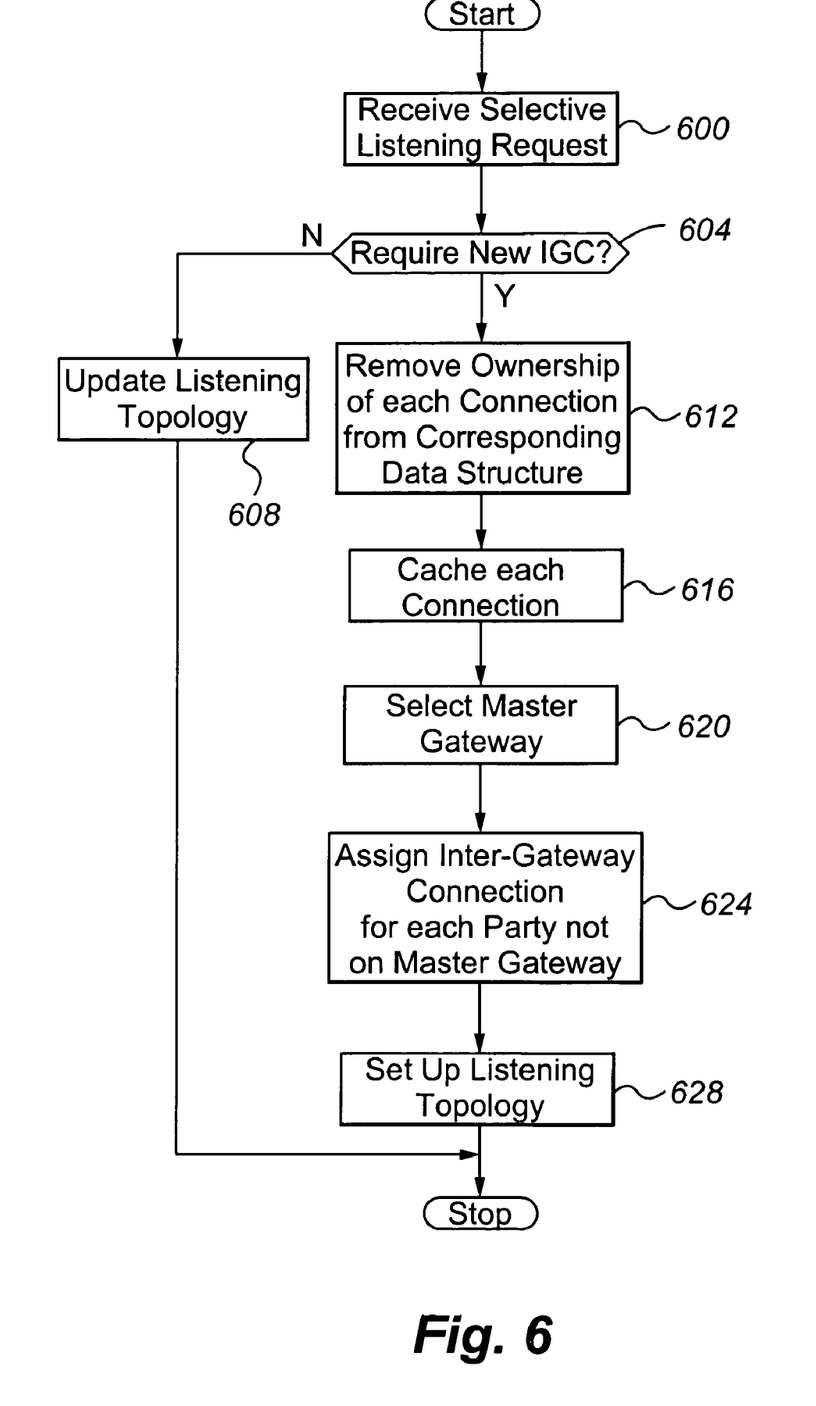
FIG. 6 is a flow chart depicting a mode of operation of the conference configuration agent of FIG. 4.

A first operational mode of the agent 436 shall now be described with reference to FIG. 6. At the start, the FIG. 6 generally assumes that the starting conference topology is a dumbbell topology such as that shown in FIG. 4.

In step 600, the agent 436 receives a selective listening request 600 from a conference call participant. As noted, the selective listening request may request that the requestor be configured to listen to and/or speak with only a subset of the parties engaged in the conference call. For example, in the example of FIG. 4 party A on the second gateway may request that he or she not listen to party D on the first gateway.

In decision diamond 604, the agent 436 determines whether the implementation of the selective listening request requires a new inter-gateway connection or IGC. For example, in FIG. 4 to implement party A's request that he or she not listen to party D a new IGC is required because the parties' respective communication devices are serviced by different gateways. However, if party D requests that he or she not listen to party E a new IGC is not required because the parties' respective communication devices are not serviced by different gateways. The changes to the listening topology may be effected entirely by reconfiguring the time slot listening assignments within the first gateway 408.

When the selective listening request does require a new inter-gateway connection, the agent 436, in step 608, updates the listening topology on the master gateway using techniques known to those of ordinary skill in the art.

When the selective listening request does not require a new inter-gateway connection, the agent 436, in step 612, removes ownership of each IGC from its corresponding data structure and, in step 616, caches the IGC. In the example of FIG. 5, the data structure 508 representing the IGC between the first and second gateways is removed from association with the service 1 500 and cached.

In step 620, the agent 436 selects which of the first and second gateways will serve as the master gateway and therefore which of the first and second gateways will serve as a slave gateway. In a dumbbell topology, the master is selected commonly based on which party initiated the conference call (the gateway initiating the call being the master) but differing factors may be used to designate the master in other topologies. In the example of FIG. 4, the first gateway is selected as the master gateway because it is connected with three communication devices while the second gateway is connected with only two communication devices. Therefore, it is more efficient to designate the first gateway as the master as it would result in the need for fewer IGC's than if the second gateway were the master. As will be appreciated, this step is performed when a star topology is to be implemented but may, of course, be omitted when the new topology does not require a master.

When the same number of parties are located on each of the gateways, other factors may be used in determining which gateway will serve as the master. The factors include, for example, which gateway initiated the call, which gateway has the most capacity, and the like.

In step 624, the agent 436 next selects each of the parties in the conference call and determines whether or not their corresponding communication device is connected to the master gateway. If not, an IGC is assigned to the party. For example, in the example of FIG. 4, parties A and B will each require an IGC as they are on the slave gateway while parties C-E will not require an IGC as they are on the master gateway. In that example, the data structure 508 for the IGC between the first and second gateways is assigned to one of parties A and B and a new IGC is constructed and assigned to the other one of parties A and B.

When all of the necessary IGC's have been assigned, the agent 436, in step 628, sets up the listening topology. In this step, the agent 436, using techniques known in the art, issues appropriate commands to each of the gateways to effect the request of party A not to listen to party D.

Figures 8A, 8B, 8C:
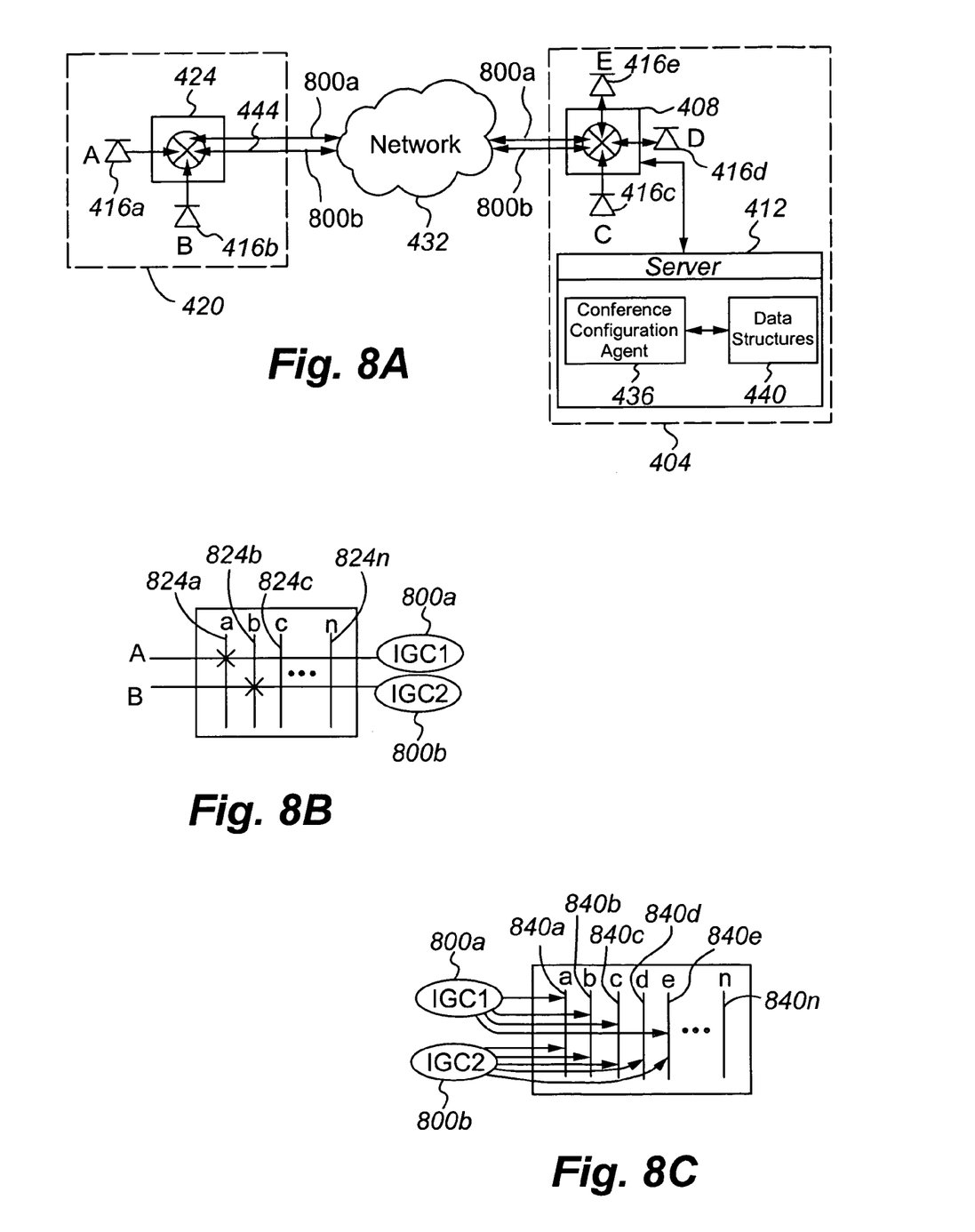
Figure 9:
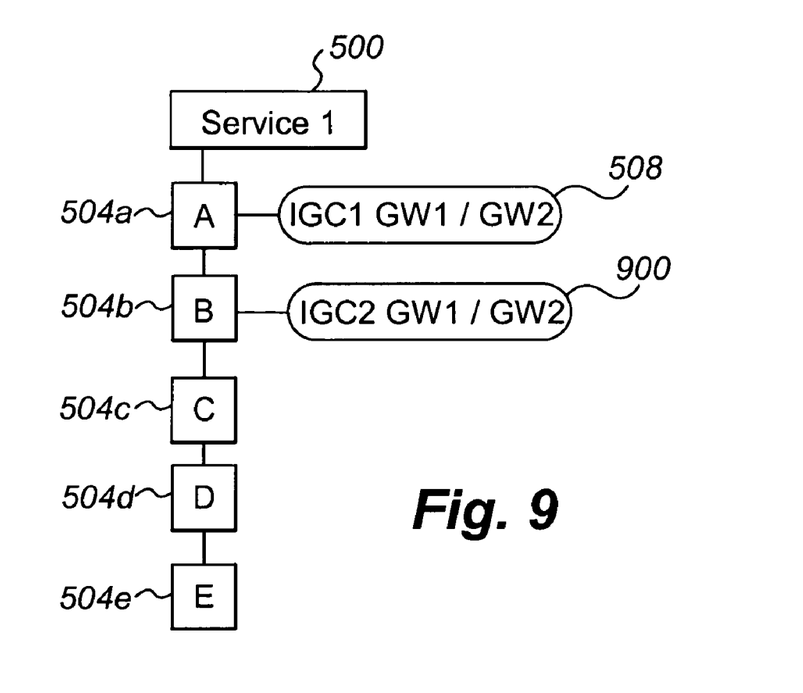
FIG. 9 depicts data structures for the arrangement of FIG. 8A.

After steps 620-628 are completed, the resulting topology (which is a star topology) is shown in FIG. 8A, and the data structures are shown in FIG. 9 (where data structure 900 represents a new IGC constructed by the agent 436). Referring to FIG. 8A, the first bidirectional audio stream or IGC 800a represents the audio stream of party A, and the second bidirectional audio stream or IGC 800b the audio stream of party B.

FIGS. 8B and C depict, respectively, the time slot assignments at each of the second and first gateways. In FIG. 8B, the first IGC 800a is assigned to communicate with the time slot 824a of party A and the second IGC 800b with the time slot 824b of party B. In FIG. 8C, the first IGC 800a is assigned to communicate with the time slots 840a of party A, 840b of party B, 840c of party D, and 840e of party E but not 840d of party D. The second IGC 800b is assigned to communicate with all of the time slots 840a-e.

Figure 7:
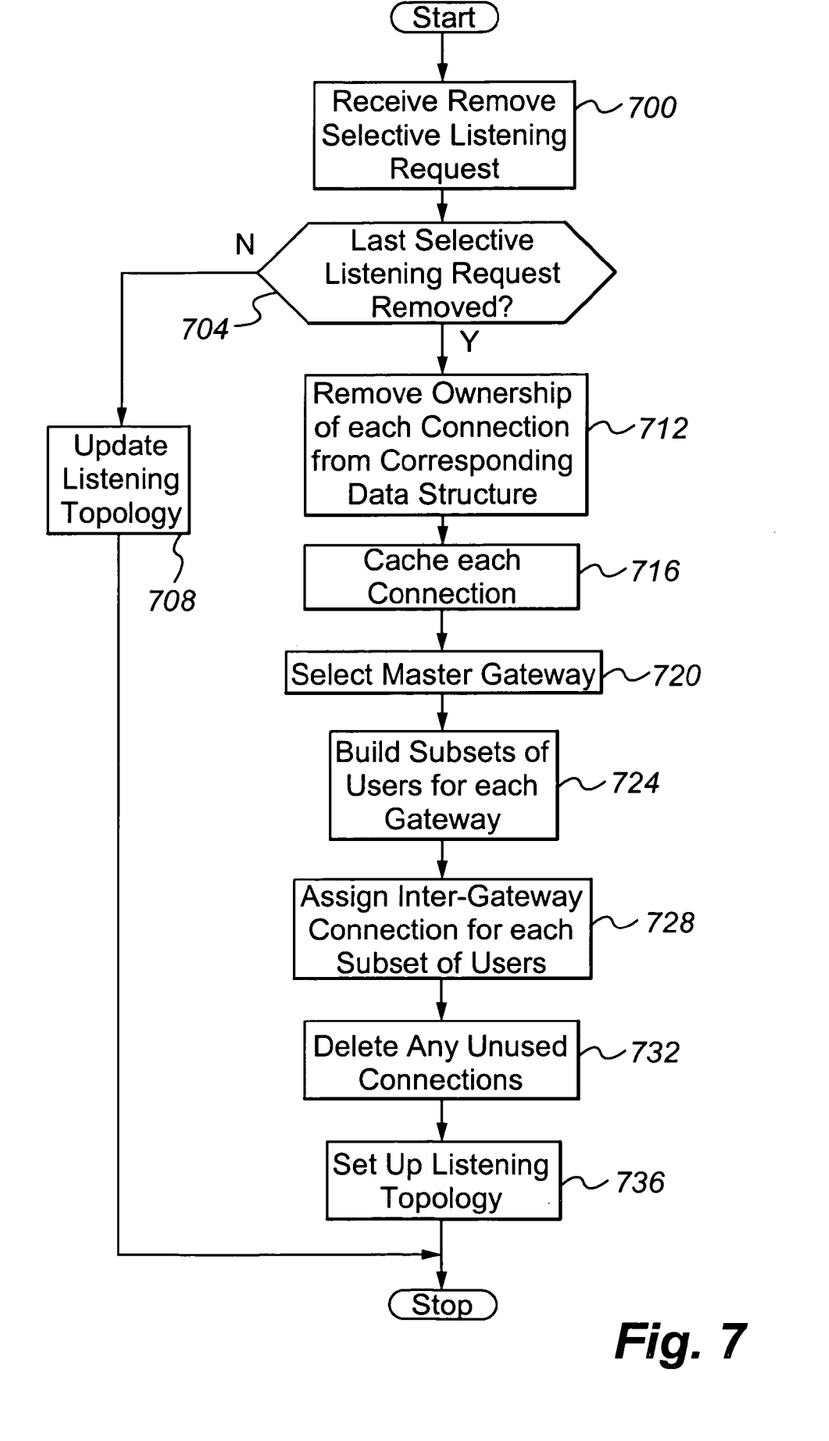
FIG. 7 is a flow chart depicting another mode of operation of the conference configuration agent of FIG. 4.

A second operational mode of the agent 436 shall now be described with reference to FIG. 7. At the start, the FIG. 7 generally assumes that the starting conference topology is a star topology such as that shown in FIG. 8A.

In step 700, the agent 436 receives a request to remove a prior inter-gateway selective listening request by one party on the master gateway regarding another party on a slave gateway, such as party A's request not to listen to party D. As will be appreciated, if the selective listening request only involved parties on the master gateway there is no need to change the topology of the IGC's.

In decision diamond 704, the agent 436 determines whether the last inter-gateway selective listening request has been removed. If not, the agent 436, in step 708, updates the listening topology on the master gateway by known techniques. If so, the agent 436 proceeds to step 712. As will be appreciated, decision diamond 704 can be modified such that no IGC topology changes are made until the last selective listening request is removed, even if the last request concerns only parties on the same gateway (i.e., not requiring a separate IGC to be constructed to implement the request).

In step 712, the agent 436 removes ownership of each IGC from the corresponding data structure and caches the IGC's in step 716.

In step 720, the agent 436 selects a new master gateway, if needed, such as using the criteria set forth previously.

In step 724, the agent 436 builds a subset of parties for each gateway. In the example of FIG. 8A, a first subset of parties would be parties A and B and a second subset of parties would be parties C-E.

In step 728, the agent 436 assigns an appropriate IGC for each subset of parties. For example, if a first subset of parties is on a first gateway, a second subset of parties is on a second gateway, a third subset of parties is on a third gateway, and the conferencing topology is a dumbbell with the first gateway being the master, then an IGC between the first and second gateways is assigned to the first and second subset of parties and an IGC between the first and third gateways is assigned to the first and third subset of parties. In the example of FIG. 8A, one of the IGC's between the first and second gateways is assigned to the service to provide the data structures of FIG. 5.

In step 732, any unused, cached IGC's are deleted.

In step 736, the agent 436 sets up the listening topology.

A number of variations and modifications of the invention can be used. It would be possible to provide for some features of the invention without providing others.

For example in one alternative embodiment, the agent 436 is implemented in hardware (such as a logic circuit), software, or a combination thereof.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for call conferencing a plurality of participants, comprising:
   (a) receiving, from a first conference call participant and during a conference call involving a plurality of participants, at least one of (i) a selective listening request and (ii) a request to remove selective listening, wherein the communication devices of the conference call participants are connected to a plurality of gateways in a first conference topology; and
   (b) changing, in response to step (a) and while the conference call is in progress, from the first conference topology to a second conference topology, wherein the first and second conference topologies have a different number of inter-gateway connections.

2. The method of claim 1, wherein a selective listening request is received from the first conference call participant and wherein the selective listening request requires at least one of (i) an audio stream of the first conference call participant not to be provided to a second conference call participant and (ii) an audio stream of the second conference call participant not to be provided to the first conference call participant.

3. The method of claim 2, wherein the first conference topology is a dumbbell and the second conference topology is a star.

4. The method of claim 2, wherein a selective listening request is received from the first conference call participant and wherein step (b) comprises:
   (B1) determining whether the selective listening request will require a new inter-gateway connection;
   (B2) when a new inter-gateway connection is required, removing ownership of each inter-gateway connection currently used in the first conference topology from an associated data structure;
   (B3) selecting one of the plurality of gateways as a master gateway;
   (B4) assigning an inter-gateway connection to at least one of a port and service associated with a participant having a corresponding communication device not connected to the master gateway, wherein at least one of the assigned inter-gateway connections is a removed inter-gateway connection; and
   (B5) setting up a listening topology to implement the selective listening request.

5. The method of claim 1, wherein a request to remove selective listening is received from the first conference call participant and wherein the selective listening request requires at least one of (i) an audio stream of the first conference call participant not to be provided to a second conference call participant and (ii) an audio stream of the second conference call participant not to be provided to the first conference call participant.

6. The method of claim 5, wherein the first conference topology is one of a star and fully inter-connected mesh and the second conference topology is a dumbbell.

7. The method of claim 6, wherein a request to remove selective listening is received and wherein step (b) comprises:
   (B1) determining whether the selective listening request to be removed is a last inter-gateway selective listening request to be removed;
   (B2) when the selective listening request is the last inter-gateway selective listening request to be removed, removing ownership of each inter-gateway connection currently used in the first conference topology from an associated data structure;
   (B3) optionally selecting one of the plurality of gateways as a master gateway;
   (B4) forming subsets of participants for each gateway involved in the conference call;
   (B5) assigning an inter-gateway connection to each subset of participants; and
   (B6) setting up a listening topology to implement the request to remove the selective listening request.

8. The method of claim 1, wherein, in data structures describing at least one of the first and second conference topologies, the inter-gateway connections do not belong to a specific port.

9. The method of claim 1, wherein, in data structures describing at least one of the first and second conference topologies, the inter-gateway connections are a non-ordered linked list that belongs to a service associated with the conference call.

10. The method of claim 9, wherein, in data structures describing at least one of the first and second conference topologies, a plurality of inter-gateway connections are linked to a common service.

11. The method of claim 1, wherein the selective listening request requires a change in directing at least one audio stream being provided to at least one of the first and a second conference call participant.

12. The method of claim 1, wherein the at least one of (i) a selective request and (ii) a request to remove selective listening is a selective listening request and wherein step (b) comprises:
   (B1) determining whether implementation of the selective listening request requires establishment of a new inter-gateway connection;
   (B2) applying, in response to step (B1), the following rules:
      (B2i) when a new inter-gateway connection is not required, update a listening topology on a master gateway without establishing a new inter-gateway connection; and
      (B2ii) when a new inter-gateway connection is required, remove ownership of each existing inter-gateway connection from a corresponding data structure and cache the inter-gateway connection;
   (B3) selecting which of first and second gateways will serve as a master gateway and which of the first and second gateways will serve as a slave gateway;
   (B4) determining, for each conference call participant, whether or not a corresponding communication device is connected to the master gateway and assigning an inter-gateway connection to each communication device not connected to the master gateway; and
   (B5) setting up the second conference topology based on the results of steps (B3) and (B4).

13. The method of claim 12, wherein, in step (B3), the master gateway is selected according to at least one of the following rules:
   (B3i) the master gateway is the gateway servicing the communication device of the conference call participant initiating the conference call;
   (B3ii) the master gateway is the gateway servicing the largest number of communication devices participating in the conference call; and
   (B3iii) the master gateway is the gateway having the most unused capacity.

14. The method of claim 1, wherein the at least one of (i) a selective request and (ii) a request to remove selective listening is a request to remove selective listening, wherein the first conference call participant is on a master gateway and the request to remove selective listening respects a second conference call participant on a slave gateway, and wherein step (b) comprises:
- (B1) determining whether the selective listening request to be removed is a last inter-gateway selective listening request to be removed;
- (B2) in response to step (B1), applying the following rules:
  - (B2i) when the selective listening request to be removed is not the last selective listening request to be removed, updating a listening topology without removing ownership of any inter-gateway connection currently used in the first conference topology from an associated data structure; and
  - (B2ii) when the selective listening request is the last inter-gateway selective listening request to be removed, removing ownership of each inter-gateway connection currently used in the first conference topology from an associated data structure;
- (B3) selecting one of the plurality of gateways as a master gateway;
- (B4) forming subsets of participants for each gateway involved in the conference call;
- (B5) assigning an inter-gateway connection to each subset of participants; and
- (B6) setting up a listening topology to implement the request to remove the selective listening request.

15. A computer readable medium encoded with computer executable instructions to perform the steps of claim 1.

16. A system for call conferencing a plurality of participants, comprising:
- (a) an input operable to receive from a first conference call participant, during a conference call, at least one of (i) a selective listening request and (ii) a request to remove selective listening, wherein the communication devices of the conference call participants are connected to a plurality of gateways in a first conference topology; and
- (b) a conference configuration agent operable to change, in response to receipt of the at least one of (i) a selective listening request and (ii) a request to remove selective listening and while the conference call is in progress, from the first conference topology to a second conference topology, wherein the first and second conference topologies have a different number of inter-gateway connections.

17. The system of claim 16, wherein a selective listening request is received from the first conference call participant and wherein the selective listening request requires at least one of (i) an audio stream of the first conference call participant not to be provided to a second conference call participant and (ii) an audio stream of the second conference call participant not to be provided to the first conference call participant.

18. The system of claim 17, wherein the first conference topology is a dumbbell and the second conference topology is a star.

19. The system of claim 17, wherein a selective listening request is received from the first conference call participant and wherein the conference configuration agent during the change from the first to the second conference topologies performs the sub-operations of:
- determining whether the selective listening request will require a new inter-gateway connection;
- when a new inter-gateway connection is required, removing ownership of each inter-gateway connection currently used in the first conference topology from an associated data structure;
- selecting one of the plurality of gateways as a master gateway;
- assigning an inter-gateway connection to at least one of a port and service associated with a participant having a corresponding communication device not connected to the master gateway, wherein at least one of the assigned inter-gateway connections is a removed inter-gateway connection; and
- setting up a listening topology to implement the selective listening request.

20. The system of claim 16, wherein a request to remove selective listening is received from the first conference call participant and wherein the selective listening request requires at least one of (i) an audio stream of the first conference call participant not to be provided to a second conference call participant and (ii) an audio stream of the second conference call participant not to be provided to the first conference call participant.

21. The system of claim 20, wherein the first conference topology is one of a star and frilly inter-connected mesh and the second conference topology is a dumbbell.

22. The system of claim 21, wherein a request to remove selective listening is received and wherein the conference configuration agent during the change from the first to the second conference topologies performs the sub-operations of:
- determining whether the selective listening request to be removed is a last inter-gateway selective listening request to be removed;
- when the selective listening request is the last inter-gateway selective listening request to be removed, removing ownership of each inter-gateway connection currently used in the first conference topology from an associated data structure;
- optionally selecting one of the plurality of gateways as a master gateway;
- forming subsets of participants for each gateway involved in the conference call;
- assigning an inter-gateway connection to each subset of participants; and
- setting up a listening topology to implement the request to remove the selective listening request.

23. The system of claim 16, wherein, in data structures describing at least one of the first and second conference topologies, the inter-gateway connections do not belong to a specific port.

24. The system of claim 16, wherein, in data structures describing at least one of the first and second conference topologies, the inter-gateway connections are a non-ordered linked list that belongs to a service associated with the conference call.

25. The system of claim 24, wherein, in data structures describing at least one of the first and second conference topologies, a plurality of inter-gateway connections are linked to a common service.

26. A method, comprising:
- (a) receiving, during a conference call among a plurality of conference call participants and from a first conference call participant, a selective listening request, wherein the selective listening request requires a change in directing at least one audio stream being provided to at least one of the first and a second conference call participant and wherein the communication devices of the conference call participants are connected to a plurality of gateways;
- (b) performing, in response to receipt of the selective listening request and during the conference call, the following sub-steps:

(B1) determining whether the selective listening request will require a new inter-gateway connection;

(B2) applying, in response to step (B1), the following rules:

(B2i) when a new inter-gateway connection is not required, update a listening topology on a master gateway without establishing a new inter-gateway connection; and (B2ii) when a new inter-gateway connection is required, remove ownership of each existing inter-gateway connection from a corresponding data structure and cache the inter-gateway connection;

(B3) selecting one of the plurality of gateways as a master gateway;

(B4) assigning an inter-gateway connection to at least one of a port and service associated with a participant having a corresponding communication device not connected to the master gateway, wherein at least one of the assigned inter-gateway connections is a removed inter-gateway connection; and (B5) setting up a listening topology to implement the selective listening request.

27. The method of claim 26, wherein rule (B2ii) applies, wherein, in data structures describing at least one of the first and second conference topologies, the inter-gateway connections do not belong to a specific port and wherein, in step (B3), the master gateway is selected according to at least one of the following rules:

(B3i) the master gateway is the gateway servicing the communication device of the conference call participant initiating the conference call;

(B3ii) the master gateway is the gateway servicing the largest number of communication devices participating in the conference call; and (B3iii) the master gateway is the gateway having the most unused capacity.

28. A method, comprising:

(a) receiving, during a conference call among a plurality of conference call participants and from a first conference call participant, a request to remove selective listening, wherein the selective listening request requires a change in directing at least one audio stream being provided to at least one of the first and a second conference call participant and wherein the communication devices of the conference call participants are connected to a plurality of gateways;

(b) performing, in response to receipt of the request to remove selective listening and during the conference call, the following sub-steps:

(B1) determining whether the selective listening request to be removed is a last inter-gateway selective listening request to be removed;

(B2) applying, in response to step (B1), the following rules:

(B2i) when a new inter-gateway connection is not required, update a listening topology on a master gateway without establishing a new inter-gateway connection; and (B2ii) when a new inter-gateway connection is required, remove ownership of each existing inter-gateway connection from a corresponding data structure and cache the inter-gateway connection;

(B3) forming subsets of participants for each gateway involved in the conference call;

(B4) assigning an inter-gateway connection to each subset of participants; and (B5) setting up a listening topology to implement the request to remove the selective listening request.

29. The method of claim 28, wherein rule (B2ii) applies, wherein, in data structures describing at least one of the first and second conference topologies, the inter-gateway connections are a non-ordered linked list that belongs to a service associated with the conference call, wherein, in data structures describing at least one of the first and second conference topologies, a plurality of inter-gateway connections are linked to a common service, and further comprising:

(B6) selecting one of the plurality of gateways as a master gateway.

* * * * *